United States Patent
Pan et al.

(10) Patent No.: US 8,760,814 B1
(45) Date of Patent: Jun. 24, 2014

(54) DISK DRIVE HEAD SUSPENSION ASSEMBLY HAVING A DLC COATING BETWEEN DIMPLE AND TONGUE

(71) Applicant: Western Digital Technologies, Inc., Irvine, CA (US)

(72) Inventors: Tzong-Shii Pan, San Jose, CA (US); David E. Fowler, San Jose, CA (US); John E. Scura, Paso Robles, CA (US); Yanning Liu, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/776,719

(22) Filed: Feb. 26, 2013

(51) Int. Cl.
*G11B 5/48* (2006.01)
(52) U.S. Cl.
USPC ......................................................... 360/245.1
(58) Field of Classification Search
USPC ......................................................... 360/245.1
See application file for complete search history.

(56) References Cited

U.S. PATENT DOCUMENTS

| | | | |
|---|---|---|---|
| 5,166,847 A * | 11/1992 | Zak | 360/245.1 |
| 5,617,274 A | 4/1997 | Ruiz | |
| 5,901,430 A | 5/1999 | Ziegler et al. | |
| 5,973,884 A | 10/1999 | Hagen | |
| 6,011,671 A | 1/2000 | Masse et al. | |
| 6,549,376 B1 | 4/2003 | Scura et al. | |
| 6,781,794 B2 * | 8/2004 | Ohwe et al. | 360/245.1 |
| 7,046,483 B2 | 5/2006 | Erpelding | |
| 7,688,552 B2 * | 3/2010 | Yao et al. | 360/245.1 |
| 7,864,488 B1 | 1/2011 | Pan | |
| 8,259,416 B1 * | 9/2012 | Davis et al. | 360/245.1 |
| 2005/0078413 A1 * | 4/2005 | Shimizu et al. | 360/234.5 |
| 2005/0270698 A1 * | 12/2005 | Oh et al. | 360/245.1 |
| 2007/0230057 A1 * | 10/2007 | Tokuyama et al. | 360/245.1 |
| 2008/0024928 A1 * | 1/2008 | Yang | 360/245.1 |
| 2009/0195919 A1 * | 8/2009 | Mahadev | 360/86 |

* cited by examiner

*Primary Examiner* — Mark Blouin

(57) ABSTRACT

A suspension assembly for a head gimbal assembly of a disk drive includes a laminated flexure that includes a tongue for attachment of a read head. The suspension assembly includes a load beam that, in a first aspect of the present invention has a protruding dimple that contacts the tongue. In this aspect of the invention, a diamond-like carbon (DLC) coating is disposed between and contacting the dimple and the tongue. For example, the DLC may be disposed on the tongue at the location of contact with the load beam dimple. Alternatively, in a second aspect of the present invention, the tongue may have a protruding dimple that contacts the load beam. In this aspect of the invention, a DLC coating is disposed between and contacting the dimple and the load beam.

18 Claims, 4 Drawing Sheets

DISK DRIVE HEAD SUSPENSION ASSEMBLY HAVING A DLC COATING BETWEEN DIMPLE AND TONGUE

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The HGA typically also includes a suspension assembly that includes a mounting plate, a load beam, and a laminated flexure to carry the electrical signals to and from the read head. The read head is typically bonded to a tongue portion of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

The read head typically comprises a slider that includes an air bearing surface (ABS) that faces the magnetic disk surface, a trailing face, and a back face that is opposite the ABS and that faces away from the ABS. A read/write transducer and a plurality of head bond pads are typically disposed on the trailing face of the slider. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media. Conventionally, the back face of the slider is typically permanently bonded to the tongue portion of the fragile laminated flexure by an adhesive, in a position such that the plurality of head bond pads are aligned with corresponding bond pads on the laminated flexure.

The load beam of the HGA suspension assembly serves to preload the read head against the surface of the spinning disk, by a preload force conventionally known as the "gram load." Such preload is functionally important to the development of the air bearing, since the pressure of the air bearing (when integrated across the air bearing surface) sums to be in equilibrium with the preload. Structurally, the preload is transferred from the load beam to the read head through a dimple contact interface between the load beam and the flexure tongue. For example, the dimple may protrude from the load beam and contact a flat surface of the flexure tongue, or else a dimple may protrude from the flexure tongue and contact the load beam.

The dimple contact is conventionally a stainless-steel-contacting-stainless-steel interface, which can become degraded by fretting wear over time. Specifically, fretting wear and corrosion may occur from prolonged relative pivoting motion at the dimple contact location, which may further cause undesirable stick and slip and corrosion at that interface, which also may create undesirable iron oxide particulate contamination within the disk drive. Hence, there is a need in the art for improved HGA suspension assembly structures and materials that may reduce wear or corrosion at the dimple contact location.

DETAILED DESCRIPTION OF EXEMPLARY EMBODIMENTS

Figure 1:
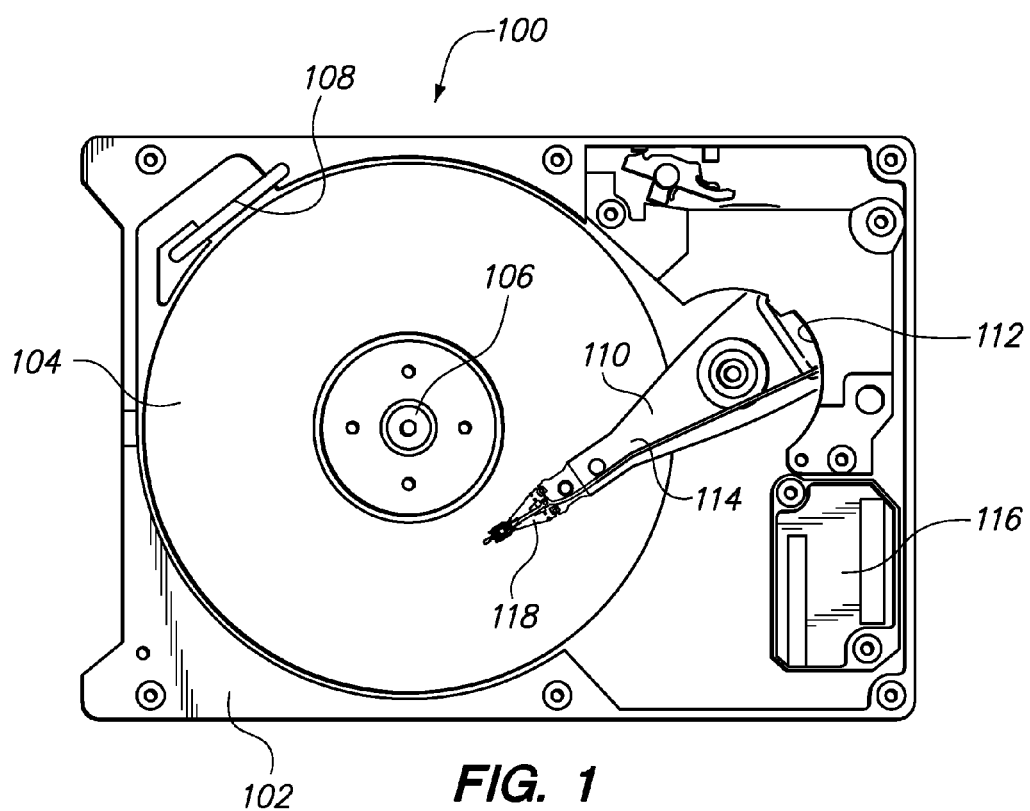
FIG. 1 is top view of a disk drive capable of including an embodiment of the present invention.

FIG. 1 is top view of a disk drive 100 that is capable of including an embodiment of the present invention. The disk drive 100 includes a disk drive base 102. The disk drive 100 further includes a spindle 106, rotably mounted on the disk drive base 102, for rotating at least one disk 104 that is mounted on the spindle 106. The rotation of the disk(s) 104 establishes air flow through optional recirculation filter 108. In certain embodiments, disk drive 100 may have only a single disk 104, or alternatively, two or more disks.

The disk drive 100 further includes a rotary coarse actuator 110 that is rotably mounted on disk drive base 102. The rotary coarse actuator 110 includes an actuator arm 114 that supports a head gimbal assembly (HGA) 118. Voice coil motor 112 rotates the actuator 110 through a limited angular range so that the HGA 118 may be desirably positioned relative to one or more tracks of information on the disk 104. Electrical signals to/from the HGA 118 are carried to other drive electronics, in part via a flex cable (not shown) and a flex cable bracket 116.

Figure 2:
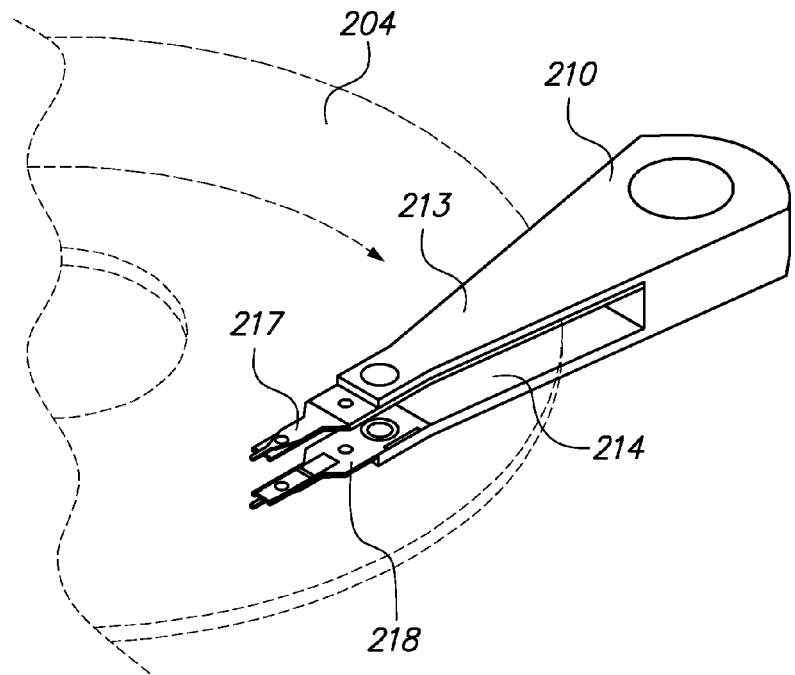
FIG. 2 is perspective view of a disk drive head actuator, capable of including an embodiment of the present invention.

Preferably the disk drive 100 will include one HGA 118 per disk surface. For example, FIG. 2 is perspective view of a disk drive head actuator 210, that has two arms 213, 214 disposed on opposite sides of a disk 204 (shown in phantom lines). Each of the actuator arms 213, 214 supports and positions one of the HGAs 217, 218 over each of the two opposing major surfaces of the disk 204. However, depopulated disk drives are also contemplated, having fewer HGAs than major disk surfaces.

Figure 3A:
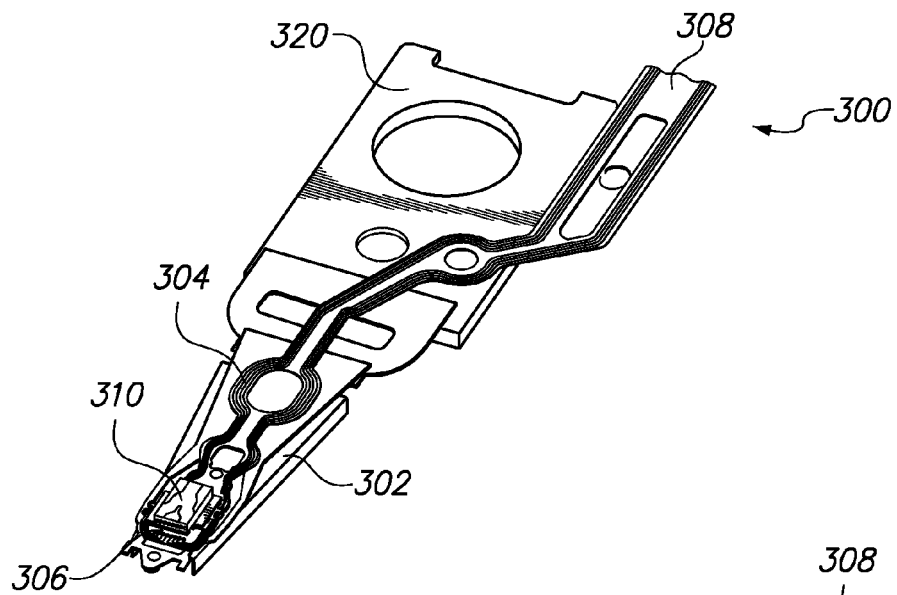
FIG. 3A is a bottom perspective view of an HGA, capable of including an embodiment of the present invention.
Figure 3B:
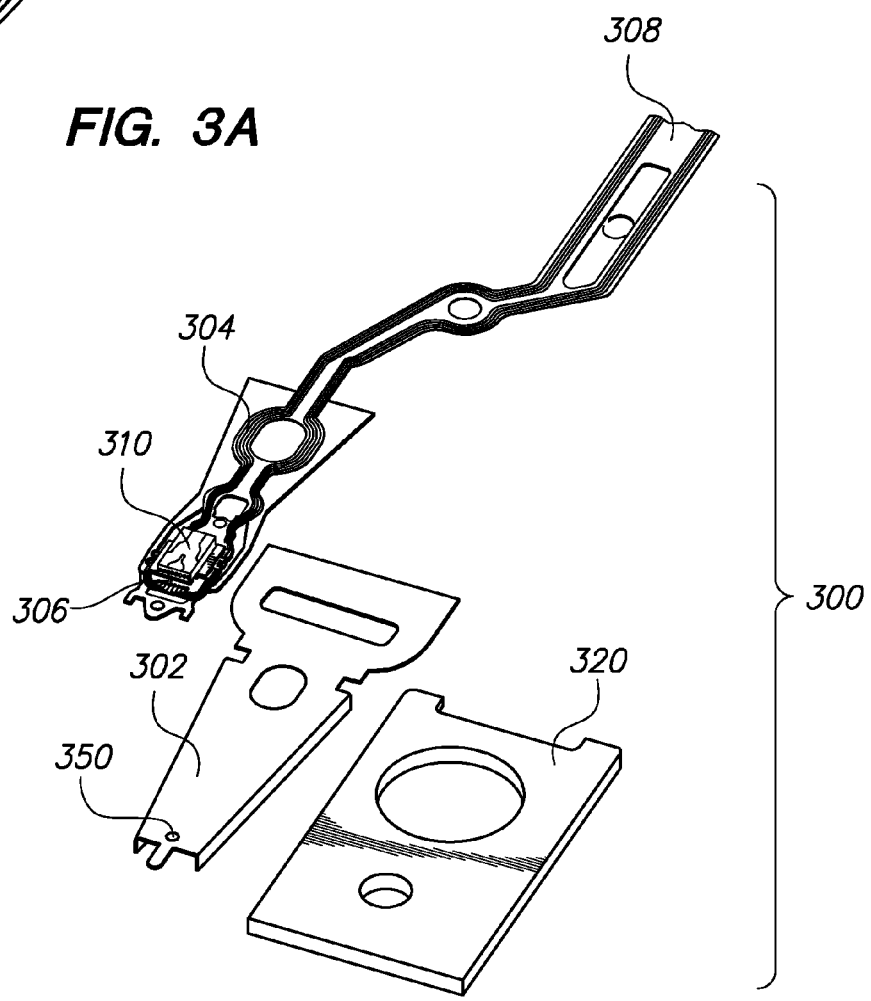
FIG. 3B is a bottom exploded perspective view of several components of a HGA according to an embodiment of the present invention.

FIG. 3A is a bottom perspective view of an HGA 300, capable of including an embodiment of the present invention. FIG. 3B is a bottom exploded perspective view of several components of the HGA 300. Now referring to FIGS. 3A-B, the HGA 300 includes a load beam 302, and a read head 310 for reading and writing data from and to a magnetic disk (e.g. disk 104 of FIG. 1).

The read head 310 of FIGS. 3A-B includes a slider substrate having an air bearing surface (the label 310 points to this surface) and an opposing top surface (not visible because facing away from the viewer in FIGS. 3A-B). The slider substrate preferably comprises AlTiC, although another ceramic or silicon might also be used. The slider substrate of the read head 310 also includes a trailing face that includes a conventional read/write transducer (too small to be visible in FIGS. 3A-B). In certain embodiments, the conventional read/write transducer is preferably an inductive magnetic write transducer merged with a magneto-resistive read transducer (e.g. a tunneling magneto-resistive read transducer).

A first purpose of the load beam 302 is to provide limited vertical compliance for the read head 310 to follow vertical undulations of the surface of a disk as it rotates. A second purpose of the load beam 302 is to preload the air bearing surface of the read head 310 against an adjacent disk surface by a preload force that is commonly referred to as the "gram load." In the embodiment of FIGS. 3A-B, the load beam 302 has a protruding dimple 350 to aide in this second purpose (as described in detail in later paragraphs herein).

In the embodiment of FIGS. 3A-B, the HGA 300 also includes a laminated flexure 304. The laminated flexure 304 includes a tongue 306 to which the read head 310 is attached. For example, the read head 310 may be bonded to the tongue 306 of the laminated flexure 304 by an adhesive such as a UV cured epoxy, thermal set epoxy, epoxy doped with an electrically conductive filler, etc., or a conventional solder material. Only a portion of the tongue 306 is visible in the view of FIGS. 3A-B because the read head 310 partially obscures it.

A first purpose of the laminated flexure 304 is to provide compliance for the head 310 to follow pitch and roll angular undulations of the surface of the disk as it rotates (with the tongue 306 effectively pivoting on the dimple 350), while restricting relative motion between the read head 310 and the load beam 302 in the lateral direction and about a yaw axis. A second purpose of the laminated flexure 304 may be to provide a plurality of electrical paths to facilitate signal transmission to/from the read head 310. For that second purpose, the laminated flexure 304 includes a plurality of electrically conductive traces that are defined in an electrically conductive (e.g. copper) sub-layer of the laminated flexure 304. The electrically conductive traces may be insulated from a support layer (e.g. stainless steel) by a dielectric layer (e.g. polyimide). The electrically conductive traces may extend away from the read head 310 along a flexure tail 308 of the laminated flexure 304, to reach a portion of the flex cable (not shown) that includes a preamplifier chip near the body of the actuator (e.g. actuator 110 of FIG. 1).

In the embodiment of FIGS. 3A-B, the load beam 302 is attached to a mounting plate 320. These components may be made of stainless steel, and their attachment to each other may be made by a plurality of spot welds, for example. In certain preferred embodiments, the suspension assembly mounting plate 320 includes an annular swage boss facilitate attachment of the suspension assembly to an actuator arm (e.g. actuator arm 114 of FIG. 1) by the conventional attachment process known as swaging. In that case, the suspension assembly mounting plate 320 may also be referred to as a "swage mounting plate."

In the embodiment of FIG. 3B, the dimple 350 of the load beam 302 protrudes upwards towards the read head 310, and contacts the tongue 306 at a dimple contact location. The load beam 302, the laminated flexure 304 (without the read head 310), and the mounting plate 320, may together be referred to as a "suspension assembly." Once the read head 310 is added to the suspension assembly (e.g. by being bonded to the tongue 306 of the laminated flexure 304), the assembly may then be referred to as a head gimbal assembly (HGA).

Figure 4:
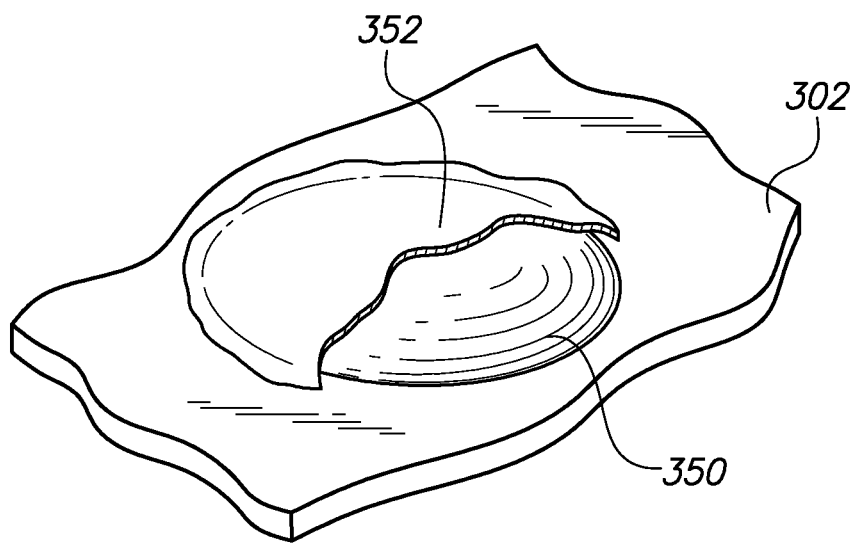
FIG. 4 is a bottom perspective view of a dimple according to an embodiment of the present invention.

FIG. 4 is a bottom perspective view of the dimple 350 protruding from the load beam 302 according to an embodiment of the present invention. The dimple 350 is shown in FIG. 4 to optionally have a convex dome shape with a substantially circular base. Now referring to FIGS. 3B and 4, a diamond-like carbon (DLC) coating 352 is adhered to the protruding dimple 350 of the load beam 302 and is therefore disposed between and contacts the dimple 350 of the load beam 302 and the tongue 306.

The term "diamond-like carbon" (DLC) is a well-known term of art in the disk drive industry, and those of ordinary skill can readily discern DLC from other forms of carbon (for example by the fractional percentage of sp3 bonds therein). The term DLC is used herein according to its ordinary meaning in the art, which excludes forms of carbon that have very low percentages of sp3 bonds. Note that DLC, as used according to its ordinary meaning in the art, does not need to be 100% carbon, but rather can be mostly carbon while also including a minority amount of impurities that were introduced accidentally or intentionally (e.g. hydrogenated DLC intentionally includes hydrogen, nitrogenated DLC intentionally includes nitrogen, and/or other elements may be present).

Figure 5:
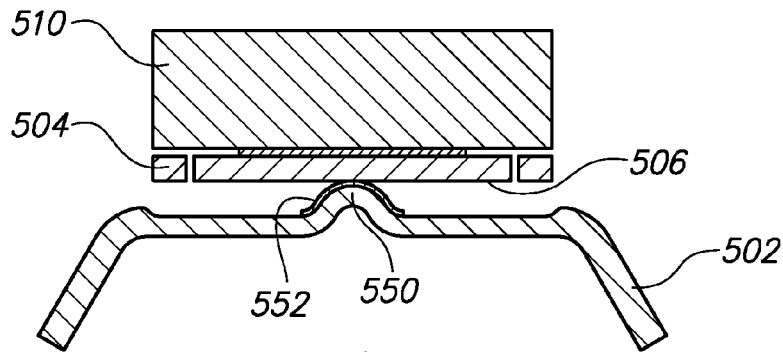
FIG. 5 is a cross-sectional view of an HGA according to an embodiment of the present invention.

FIG. 5 is a cross-sectional view of an HGA according to an embodiment of the present invention. In the embodiment of FIG. 5, a load beam 502 includes a protruding dimple 550. A DLC coating 552 is adhered to the dimple 550 of the load beam 502, and the DLC coating 552 so is disposed between and contacting the dimple 550 and the tongue 506 of a laminated flexure 504. A read head 510 is bonded to the tongue 506. In certain embodiments, the DLC coating may have a DLC thickness that is optionally in the range 3 nm to 50 nm.

Figure 6:
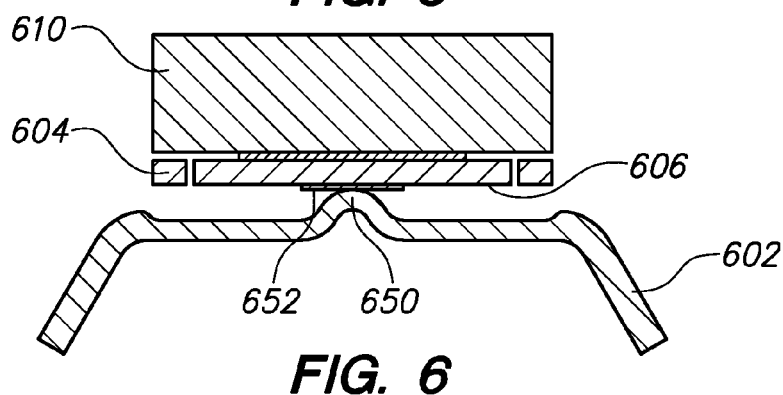
FIG. 6 is a cross-sectional view of an HGA according to another embodiment of the present invention.

FIG. 6 is a cross-sectional view of an HGA according to another embodiment of the present invention. In the embodiment of FIG. 6, a load beam 602 includes a protruding dimple 650. A DLC coating 652 is adhered to a tongue 606 of a laminated flexure 604, and the DLC coating 652 is disposed between and contacting the dimple 650 and the tongue 606. In certain alternative embodiments, the DLC coating 652 may be adhered within an etched recession in the surface of the tongue 606 of the laminated flexure 604, for example to reduce the amount or risk of portions of the DLC coating 652 separating from the tongue 606 and contaminating the disk drive. A read head 610 is bonded to the tongue 606. In certain embodiments, the DLC coating may be preferably adhered to a stainless steel structural layer of the tongue 606 of the laminated flexure 604 by a seed layer (e.g. titanium, silicon, silicon nitride) having a seed layer thickness in the range 0.5 nm to 10 nm.

Figure 7:
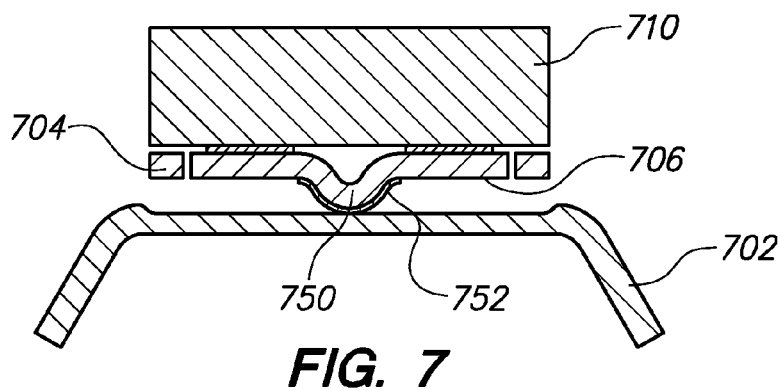
FIG. 7 is a cross-sectional view of an HGA according to another embodiment of the present invention.

FIG. 7 is a cross-sectional view of an HGA according to another embodiment of the present invention. In the embodiment of FIG. 7, a load beam 702 does not have a protruding dimple. Rather, the tongue 706 of a laminated flexure 704 includes a protruding dimple 750. A DLC coating 752 is adhered to the protruding dimple 750 of the tongue 706 of the laminated flexure 704. Hence, the DLC coating 752 is disposed between and contacting the dimple 750 and the load beam 702. A read head 710 is bonded to the tongue 706. In certain embodiments, the DLC coating may have a DLC thickness that is preferably no greater than 10 nm.

Note that like the dimples of other embodiments disclosed herein, the dimple 750 may be stamped by a forming operation, in which case the material thickness of the dimple 750 will be approximately equal to the thickness of the surrounding material of the tongue 706 (as shown in FIG. 7). Alternatively, the dimple 750 may be fabricated by a coining operation, in which case the material thickness of the dimple 750 may be substantially different from the surrounding material of the tongue 706. Alternatively the dimple 750 may be fabricated by an etching operation, in which case the profile of the dimple 750 may be somewhat stepped or angular rather than rounded. Note that one of ordinary skill can readily recognize the tell-tale structural characteristics of these various dimple fabrication options, so that they are not merely fabrication process options, but are also discernable optional structural characteristics of the dimple 750. For example, as described above, the structure of a "coined dimple" is recognizable to one of ordinary skill in the art, and is distinct compared to the structure of an "etched dimple" or the structure of a "formed dimple."

Figure 8:
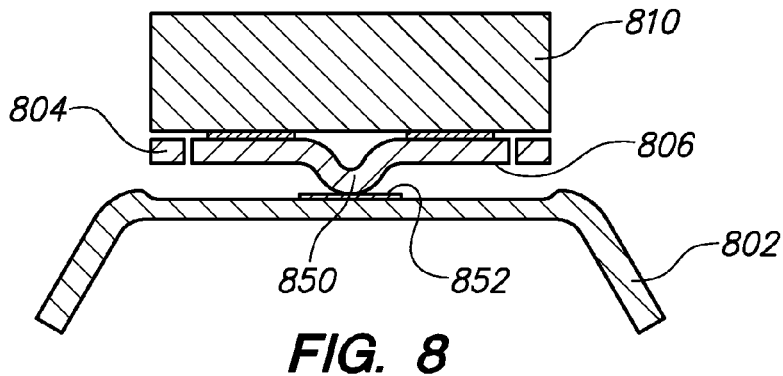
FIG. 8 is a cross-sectional view of an HGA according to another embodiment of the present invention.

FIG. 8 is a cross-sectional view of an HGA according to another embodiment of the present invention. In the embodiment of FIG. 8, a load beam 802 does not have a protruding dimple. Rather, the tongue 806 of a laminated flexure 804 includes a protruding dimple 850. A DLC coating 852 is adhered to the load beam 802 at a location of dimple contact. Hence, the DLC coating 852 is disposed between and contacting the dimple 850 and the load beam 802. A read head 810 is bonded to the tongue 806. In certain embodiments, the DLC coating may be preferably adhered to a stainless steel surface of the load beam 802 by a seed layer (e.g. titanium, silicon, silicon nitride) having a seed layer thickness in the range 0.5 nm to 10 nm.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
a disk drive base;
a disk rotably mounted to the disk drive base;
an actuator pivotably mounted to the disk drive base; and
a head gimbal assembly attached to the actuator, the head gimbal assembly comprising
a read head; and
a suspension assembly that comprises
a load beam that includes a protruding dimple;
a laminated flexure that includes a tongue to which the read head is attached; and
a diamond-like carbon (DLC) coating disposed between and contacting the dimple and the tongue;
wherein the DLC coating has a DLC thickness in the range 3 nm to 50 nm.

2. The disk drive of claim 1 wherein the DLC thickness is no greater than 10 nm.

3. The disk drive of claim 1 wherein the load beam comprises stainless steel, and wherein the laminated flexure comprises a stainless steel structural layer, a polyimide dielectric layer, and a copper conductive layer, and the tongue includes at least part of the stainless steel structural layer.

4. The disk drive of claim 3 wherein the DLC coating is adhered to the stainless steel structural layer of the tongue of the laminated flexure.

5. The disk drive of claim 1 wherein the protruding dimple has a convex dome shape with a substantially circular base.

6. The disk drive of claim 1 wherein the DLC coating is adhered to the protruding dimple of the load beam.

7. A disk drive comprising:
a disk drive base;
a disk rotably mounted to the disk drive base;
an actuator pivotably mounted to the disk drive base; and
a head gimbal assembly attached to the actuator, the head gimbal assembly comprising
a read head; and
a suspension assembly that comprises
a load beam that includes a protruding dimple;
a laminated flexure that includes a tongue to which the read head is attached; and
a diamond-like carbon (DLC) coating disposed between and
contacting the dimple and the tongue;
wherein the DLC coating is adhered to the stainless steel structural layer of the tongue of the laminated flexure by a seed layer having a seed layer thickness in the range 0.5 nm to 10 nm, the seed layer comprising a material selected from the group consisting of titanium, silicon, and silicon nitride.

8. A head gimbal assembly (HGA) for a disk drive, the HGA comprising:
a read head; and
a suspension assembly that comprises
a load beam;
a laminated flexure that includes a tongue to which the read head is attached, the tongue including a protruding dimple; and
a diamond-like carbon (DLC) coating disposed between and contacting the dimple and the load beam;
wherein the DLC coating has a DLC thickness in the range 3 nm to 50 nm.

9. The HGA of claim 8 wherein the DLC thickness is no greater than 10 nm.

10. The HGA of claim 8 wherein the load beam comprises stainless steel, and wherein the laminated flexure comprises a stainless steel structural layer, a polyimide dielectric layer, and a copper conductive layer, and the tongue includes at least part of the stainless steel structural layer, the dimple being formed in the stainless steel structural layer at the tongue.

11. The HGA of claim 10 wherein the DLC coating is adhered to the stainless steel structural layer of the tongue of the laminated flexure.

12. The HGA of claim 8 wherein the protruding dimple has a convex dome shape with a substantially circular base.

13. The HGA of claim 8 wherein the DLC coating is adhered to the load beam.

14. A head gimbal assembly (HGA) for a disk drive, the HGA comprising:
a read head; and
a suspension assembly that comprises
a load beam;

a laminated flexure that includes a tongue to which the read head is attached, the tongue including a protruding dimple; and a diamond-like carbon (DLC) coating disposed between and contacting the dimple and the load beam;

wherein the load beam comprises stainless steel, and wherein the laminated flexure comprises a stainless steel structural layer, a polyimide dielectric layer, and a copper conductive layer, and the tongue includes at least part of the stainless steel structural layer, the dimple being formed in the stainless steel structural layer at the tongue;

wherein the DLC coating is adhered to the stainless steel structural layer of the tongue of the laminated flexure; and wherein the DLC coating is adhered to the stainless steel structural layer of the tongue of the laminated flexure by a seed layer having a seed layer thickness in the range 0.5 nm to 10 nm, the seed layer comprising a material selected from the group consisting of titanium, silicon, and silicon nitride.

15. A head suspension assembly for a disk drive, the head suspension assembly comprising:

a load beam that includes a protruding dimple;

a laminated flexure that includes a head mounting tongue; and a diamond-like carbon (DLC) coating disposed between and contacting the dimple and the head mounting tongue;

wherein the DLC coating has a DLC thickness in the range 3 nm to 50 nm.

16. The head suspension assembly of claim 15 wherein the DLC thickness is no greater than 10 nm.

17. The head suspension assembly of claim 15 wherein the DLC coating is adhered to the head mounting tongue of the laminated flexure.

18. The head suspension assembly of claim 15 wherein the DLC coating is adhered to the protruding dimple of the load beam.

* * * * *